United States Patent
Di Luoffo et al.

(10) Patent No.: US 7,814,010 B2
(45) Date of Patent: *Oct. 12, 2010

(54) METHOD AND APPARATUS FOR DISPLAYING EMBEDDED CHIP STATES AND EMBEDDED CHIP END-USER APPLICATION STATES

(75) Inventors: Vincenzo Valentino Di Luoffo, Sandy Hook, CT (US); Craig William Fellenstein, Brookfield, CT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/491,150

(22) Filed: Jun. 24, 2009

(65) Prior Publication Data

US 2009/0255988 A1    Oct. 15, 2009

Related U.S. Application Data

(63) Continuation of application No. 10/443,680, filed on May 22, 2003, now abandoned.

(51) Int. Cl.
*G06Q 40/00* (2006.01)
(52) U.S. Cl. .......................... 705/39; 705/40
(58) Field of Classification Search ............... 705/39–40
See application file for complete search history.

(56) References Cited

U.S. PATENT DOCUMENTS 5,544,246 A    8/1996    Mandelbaum et al.
5,898,783 A    4/1999    Rohrbach
6,131,090 A    10/2000   Basso, Jr. et al.
6,195,700 B1   2/2001    Bender et al.
6,199,762 B1   3/2001    Hohle
6,419,161 B1   7/2002    Haddad et al.
6,901,374 B1   5/2005    Himes
7,213,254 B2   5/2007    Koplar et al.

OTHER PUBLICATIONS

USPTO office action for U.S. Appl. No. 10/443,669 (AUS920030093US1) dated Feb. 4, 2010.

*Primary Examiner*—Thu Thao Havan
(74) *Attorney, Agent, or Firm*—Yee & Associates, P.C.; William H. Steinberg

(57) ABSTRACT

A method and apparatus for managing applications installed on a smartcard. The invention comprises a Smartcard Management Program (SMP), a User Action Program (UAP), a User Command Program (UCP), an Application Status Update Program (ASUP), and a Card Status Update Program (CSUP). The SMP interfaces with smartcard communications system and accepts the user commands. The UAP obtains applications from external sources, updates the user profile, and transmits the user profile to the user for viewing on a graphical user interface. The UCP breaks the user commands into card actions and application actions and executes the card actions and application actions. The ASUP updates the user profile by changing the entry in an application name column, an application status column, a user action column, and an information column. The CSUP updates the user profile by changing the entry in the card status field.

24 Claims, 7 Drawing Sheets

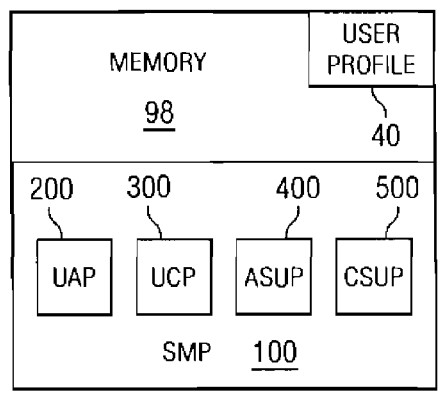
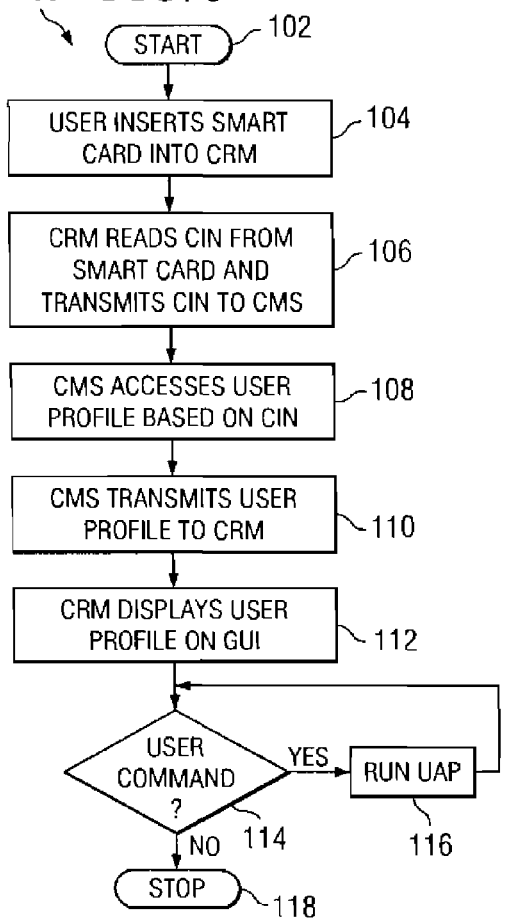
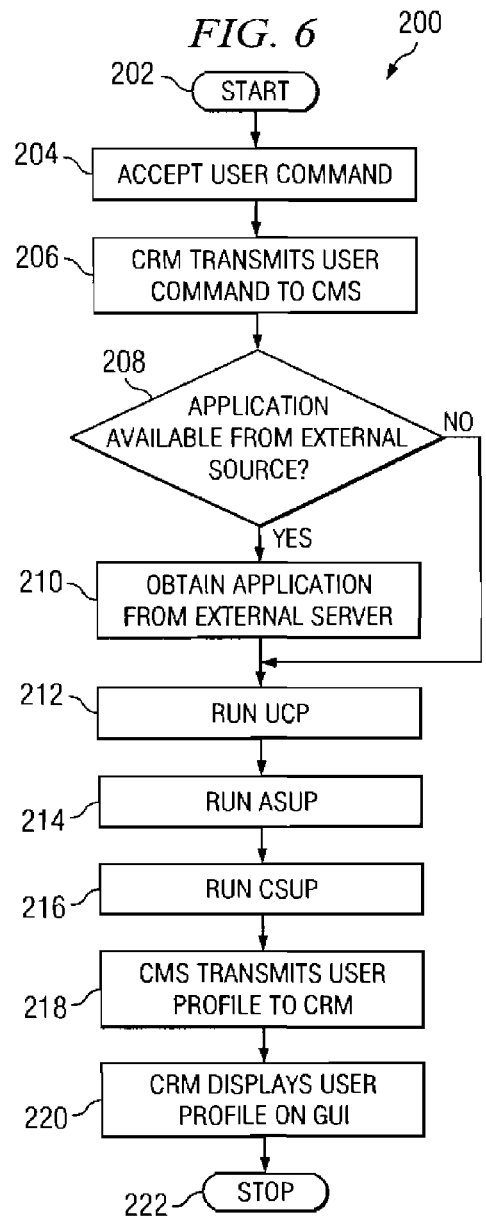

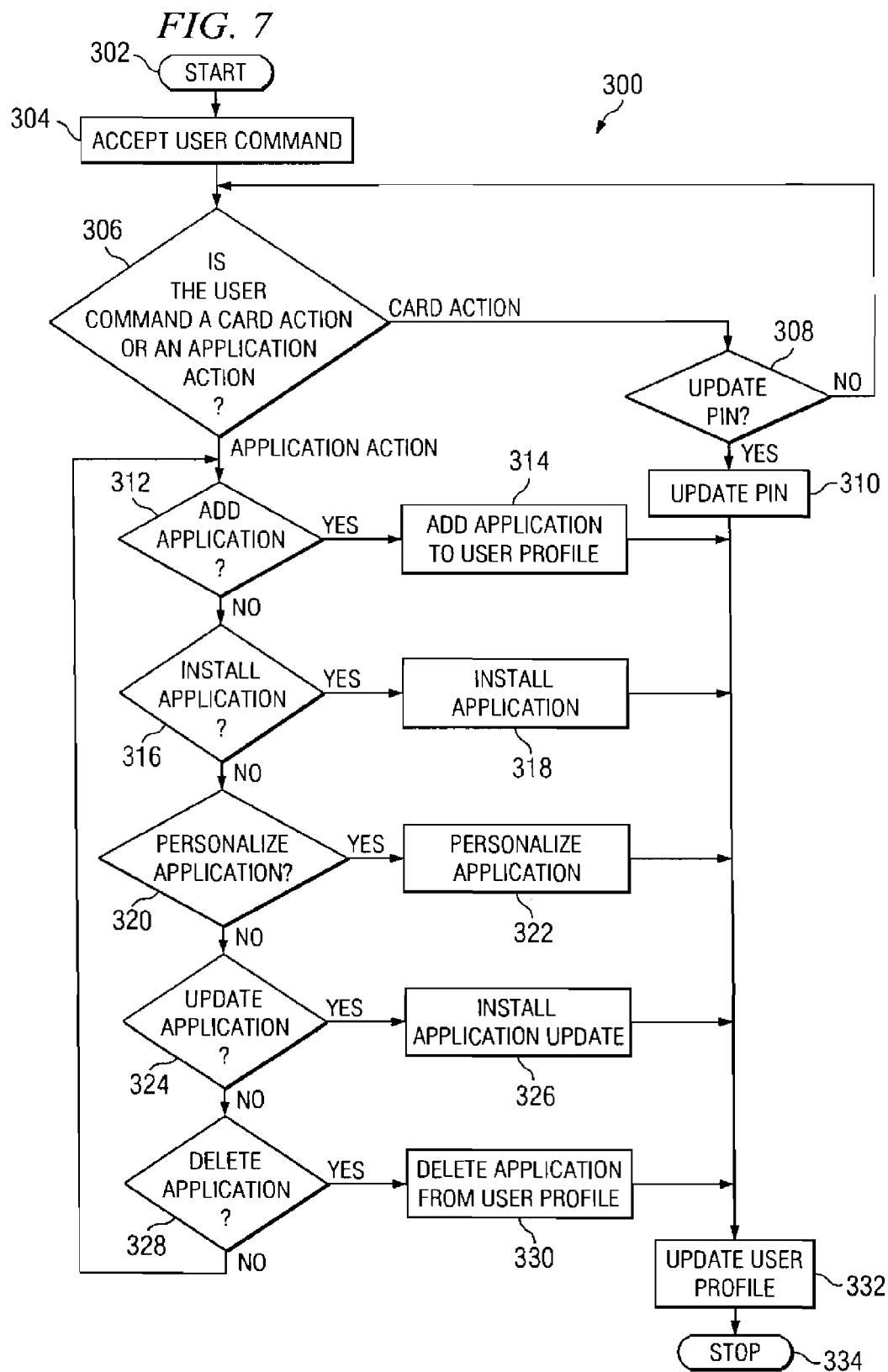

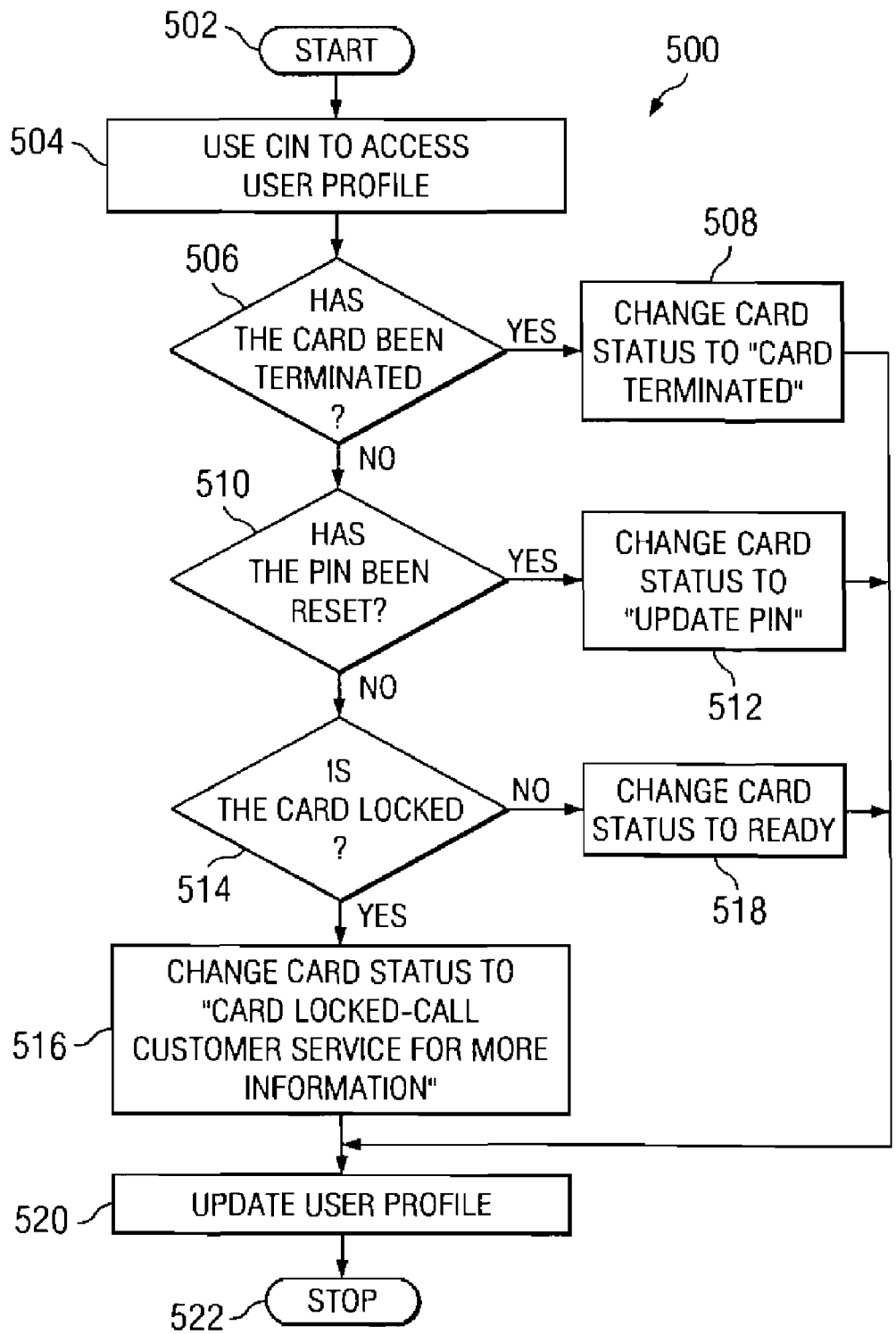

METHOD AND APPARATUS FOR DISPLAYING EMBEDDED CHIP STATES AND EMBEDDED CHIP END-USER APPLICATION STATES

This application is a continuation of application Ser. No. 10/443,680 filed May 22, 2003, status allowed.

CROSS-REFERENCE TO RELATED APPLICATION

The subject matter of the present application is related to U.S. patent application Ser. No. 10/443,670, and U.S. patent application Ser. No. 10/443,669, incorporated herein by reference.

FIELD OF THE INVENTION

The present invention is related generally to the organization of financial accounts. Specifically, the present invention is directed towards a method of managing smartcard applications.

BACKGROUND OF THE INVENTION

The use of credit cards in consumer transactions is well known in the art. A credit card is defined as an account card issued by a specific bank or financial institution for the purpose of purchasing goods and services on credit provided by the bank or financial institution. Credit cards typically have a preset spending limit and specific terms regarding payment terms, interest rates, grace periods, and other terms and conditions. However, the credit card itself does not contain any information other than the account number. In order to complete a transaction, the credit card account number is read from the card, sent to the bank or financial institution for verification of account and charge authorization, and returned to the vendor with approval for the transaction to proceed. The transaction process can be time consuming when the transaction occurs during peak purchasing periods or when the transaction takes place in a foreign country. The transaction may be stopped entirely if the vendor is unable to establish communications with the bank. Moreover, credit cards apply to a single account. In other words, the bank or financial institution must issue one credit card to the consumer for every account, requiring the consumer to carry multiple credit cards when the consumer has more than one account. Therefore, a need exists for a credit card that can be used for multiple accounts.

Debit cards are also well known in the art. With a debit card the consumer spends money already deposited in an account, rather than creating a credit account that will be paid at some later time. Debit cards are frequently used with deposit accounts such as checking, savings, and money market accounts. Unfortunately, like credit cards, debit cards card only contain a single account number. The vendor must still authorize the transaction through a communications network in order for the transaction to proceed, and the debit card can only be used for transactions with a single account. Therefore, a need exists for a debit card that can be used for multiple accounts.

A smartcard is one solution to the problems encountered with traditional credit and debit cards. A smartcard is a card, sized similarly to a credit card, which contains a processor and a memory. A smartcard is more advantageous than a credit card in that the smartcard can store and update account information within the smartcard memory. Storing and updating the account information within the smartcard memory is advantageous because charge authorization can be obtained directly from the card itself rather than through communications with the bank or financial institution. Moreover, because the smartcard has the ability to store and update information, one smartcard can contain information regarding a plurality of accounts. The ability of the smartcard to store account information on a plurality of accounts eliminates the need for the consumer to carry a plurality of cards. Instead, the consumer can carry one smartcard that contains account information for the user's checking, savings, money market, and credit accounts.

Moreover, smartcards contain additional flexibility because a user can add various applications onto their smartcard. One example of an application for a smartcard is a health care application. In a health care application, a smartcard may contain the user's heath insurance information so that the user's doctor can scan the smartcard and receive the patient's updated medical and insurance information, thereby streamlining the information exchange between the doctor, the patient, and the insurer. A similar application can be added to the smartcard for prescription drugs so that the doctor can use the card to know the status of the user's prescriptions.

Another example of an application is an airline frequent flyer application. In the frequent flyer application, the smartcard contains the user's frequent flyer information such as the account number, mileage balance, status level, and so forth. When the user purchases air travel with the smartcard, the frequent flyer information is automatically connected to the travel information, streamlining the exchange of information between the user and the airline.

However, the combination of a plurality of accounts and applications on a single smartcard creates new problems that were not previously encountered with credit or debit cards. One of these problems is efficient organization and maintenance of the accounts and applications on the smartcard. Smartcard users need to be able to add, modify, update, and delete accounts and applications as needed. Therefore, a need exists for an efficient method of organizing and maintaining accounts and applications associated with a smartcard.

The problem of smartcard management has been addressed by the prior art. U.S. Pat. No. 5,544,246 (the '246 patent) entitled "Smartcard Adapted for a Plurality of Service Providers and for Remote Installation of Same" discloses a method of organizing and limiting access to the files installed within a smartcard. U.S. Pat. No. 6,199,762 B1 (the '762 patent) entitled "Methods and Apparatus for Dynamic Smartcard Synchronization and Personalization" discloses an account maintenance system for a smartcard. What is needed beyond the '246 patent and the '762 patent is a method for organizing a plurality of accounts and applications associated with a smartcard.

Consequently, a need exists in the art for a method for organizing accounts and applications associated with a smartcard. Furthermore, a need exists for a method for adding, deleting, updating, and modifying accounts and applications associated with a smartcard. The need extends to an apparatus for implementing the aforementioned methods.

SUMMARY OF THE INVENTION

The present invention, which meets the needs identified above, is a method and apparatus for managing applications installed on a smartcard. The present invention can be embodied in a software program operable on a computer. In the software embodiment, the invention comprises a Smartcard Management Program (SMP), a User Action Program (UAP), a User Command Program (UCP), an Application Status Update Program (ASUP), and a Card Status Update Program (CSUP). The SMP interfaces with smartcard communications system and accepts the user commands. The UAP obtains applications from external sources, updates the user profile, and transmits the user profile to the user for viewing on a graphical user interface (GUI).

The UCP breaks the user commands into card actions and application actions and executes the card actions and application actions. Possible card actions include updating the PIN. Possible application actions include adding, installing, personalizing, updating, and deleting an application.

The ASUP updates the user profile by changing the entry in an application name column, an application status column, a user action column, and an information column. Possible application states include without limitation: new, downloaded, installed, ready, update available, blocked, unblocked and personalized. An application is new when the application is available to the user. An application is downloaded when the user has downloaded the compressed data file for the application to the smartcard. An application is installed when the user has installed the compressed data file. An application is personalized when it has been properly set up by the user, possibly including registration. An application is ready when it is ready to be used. An application has an update available when there is a downloadable update available for the application. An application is blocked when the application issuer or the smartcard issuer has temporarily blocked the application. An application issuer or smart card issuer can also unblock an application.

The CSUP updates the user profile by changing the entry in the card status field. Possible card states include without limitation: terminated, updated PIN, and locked. The card is terminated when the smartcard issuer blocks all activity on the smartcard, such as when the smartcard is lost or stolen. The PIN needs to be updated when the smartcard issuer resets the PIN, possibly for security reasons. The card is locked when the smartcard issuer wants to temporarily block activity on the smartcard, possibly to affirm that the activity on the card is not fraudulent.

BRIEF DESCRIPTION OF THE DRAWINGS

The novel features believed characteristic of the invention are set forth in the appended claims. The invention itself, however, as well as a preferred mode of use, further objectives and advantages thereof will best be understood by reference to the following detailed description of an illustrative embodiment when read in conjunction with the accompanying drawings, wherein:

FIG. 4 is an illustration of a computer memory containing the computer program embodiment of the present invention;

FIG. 5 is a flowchart of the logic of the Smartcard Management Program (SMP) of the present invention;

FIG. 6 is a flowchart of the logic of the User Action Program (UAP) of the present invention;

FIG. 7 is a flowchart of the logic of the User Command Program (UCP) of the present invention;

FIG. 9 is a flowchart of the Card Status Update Program (CSUP) of the present invention.

DETAILED DESCRIPTION OF THE PREFERRED EMBODIMENT

"Application issuer" shall have the same meaning herein as the term "Application Provider" (AP).

"Chip" means a processor and a memory contained within a smart card wherein the processor is connected to the memory and is capable of wired or wireless communication with a card reader or card reader/writer.

"Chip Information Number" (CIN) means a unique number assigned to each individual chip. The CIN can be used to identify the correct smartcard user when used in conjunction with a PIN.

"Chip Management System" (CMS) means a system that manages the lifecycle of the chip including without limitation storage and management of a card profile associated with a chipholder.

"Client Card System" means a computer having an interface for communication with a smart card.

"Computer" means a machine having a processor, a memory, and an operating system, capable of interaction with a user or other computer, and shall include without limitation: desktop computers, notebook computers, servers, personal digital assistants (PDAs), handheld computers, and cell phones.

"Display" means a visual depiction of a web page or computer program on a graphical user interface (GUI).

"Distribution Server" (DS) means a server that is a trusted node to the CMS that can obtain the chipholder profile from the CMS and package information from the chipholder profile into Application Protocol Data Units (APDU). The DS has an Intelligent Gateway mode where the user is directly interfacing with the server or a router mode where another device such as an automatic teller machine (ATM) is performing the interaction with the user.

"Input device" means a keyboard, mouse, trackball, touchpad, touchpoint device, stylus pen, touch screen, or any other type of device used to input data into a computer.

"Post-issuance data" means instructions and data for adding, modifying, or deleting data stored in a chip. One type of post issuance data is a user profile.

"Personal Information Number" (PIN) means a unique number assigned to each individual smartcard. The PIN can be used to identify the correct smartcard user when used in conjunction with a CIN.

"Security Server" (SS) means a server that provides for secure transmission of data from the CMS to the DS.

"Smartcard" means a card used for personal or business transactions comprising at least a processor and a memory capable of supporting an operating system application programs, storage of chip holder personalization data, application data and other data as may be required by the issuer of a smart card.

"User interaction" means activating a button on a display by clicking on the button with a user input device or by touching the screen with a human hand or object; or activating a menu item on a display by clicking on the item with a user input device or by touching the screen with a human hand or object.

Figure 1:
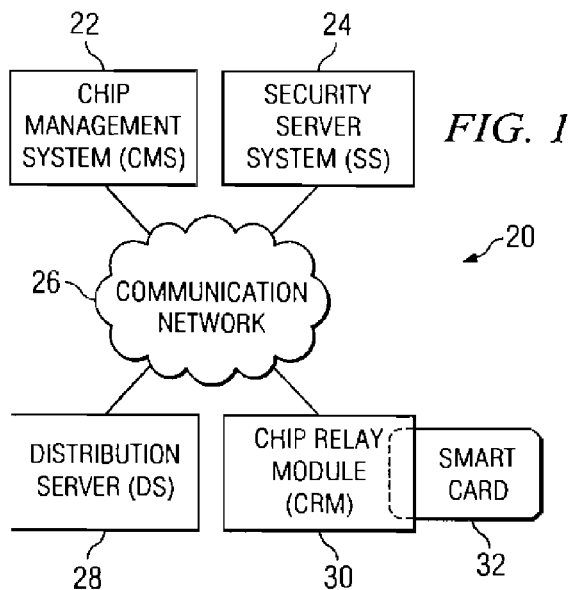
FIG. 1 is an illustration of the communications system associated with a smartcard.

FIG. 1 is a diagram of one embodiment of a system 20 for carrying out operations associated with and providing post-issuance data to smartcard 32. Smartcard 32 is shown inserted into client card system (CSS) 30. CSS 30 may be, for example, a point-of-sale terminal, an automatic teller machine (ATM), or similar device. In general, smartcard 32 is capable of communicating with CSS 32. For example, smartcard 32 may have a set of electrically conductive contacts arranged on a surface, and CSS 30 may have a similarly arranged set of electrically conductive contacts located in a smart card interface. When smartcard 32 is inserted into CSS 30, corresponding members of the two sets of contacts may come into physical contact with one another. In addition, smartcard 32 is preferably capable of establishing and carrying out secure communications with CSS 30 as described in U.S. patent application Ser. No. 10/443,670.

In addition to CSS 30 and smartcard 32, system 20 also includes chip management system (CMS) 22, security server (SS) 24, distribution server (DS) 28, and communication network 26. As indicated in FIG. 1, CSS 30, CMS 22, SS 24, and DS 28 are connected to communication network 26. Communication network 26 includes, without limitation, the public switched telephone network (PSTN) and/or the Internet. CSS 30, CMS 22, SS 24, and DS 28 communicate with one another via communication network 26 to convey post-issuance data to smartcard 32 via a secure communication channel established within communication network 26.

Figure 2:
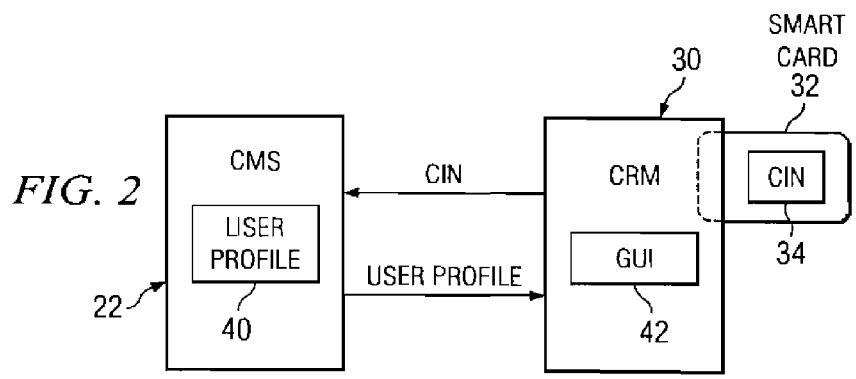
FIG. 2 is an illustration of the flow of information between the smartcard, the chip management system (CMS), and the client card system (CCS)
Figure 10:
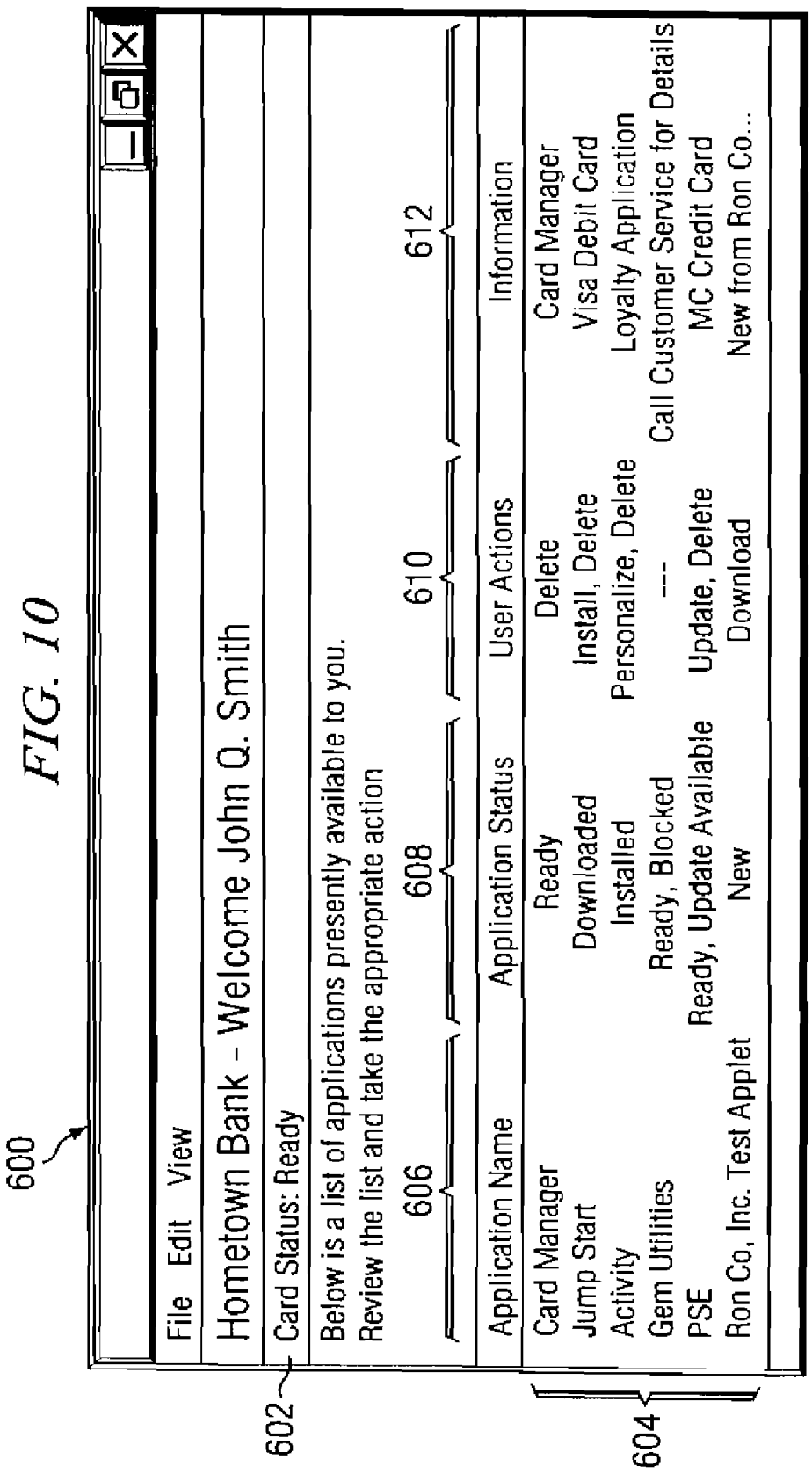
FIG. 10 is an illustration of the display of the graphical user interface (GUI) on the CSS associated with the present invention.

One type of post-issuance data is the user profile described herein. FIG. 2 is an illustration of the process of CSS 30 obtaining user profile 40 from CMS 22. FIG. 2 is best understood when viewed in conjunction with Smartcard Management Program (SMP) 100 in FIG. 5. When smartcard 32 is inserted into CSS 30, CSS 30 reads CIN 34 from smartcard 32. CSS 30 then transmits CIN 34 to CMS 22. CMS 22 uses CIN 34 to access the user's profile 40. CMS 40 then transmits user profile 40 back to CSS 30, where CSS 30 displays user profile 40 on graphical user interface (GUI) 42. Display 600 in FIG. 10 is one possible illustration of the display of GUL 42.

Figure 3:
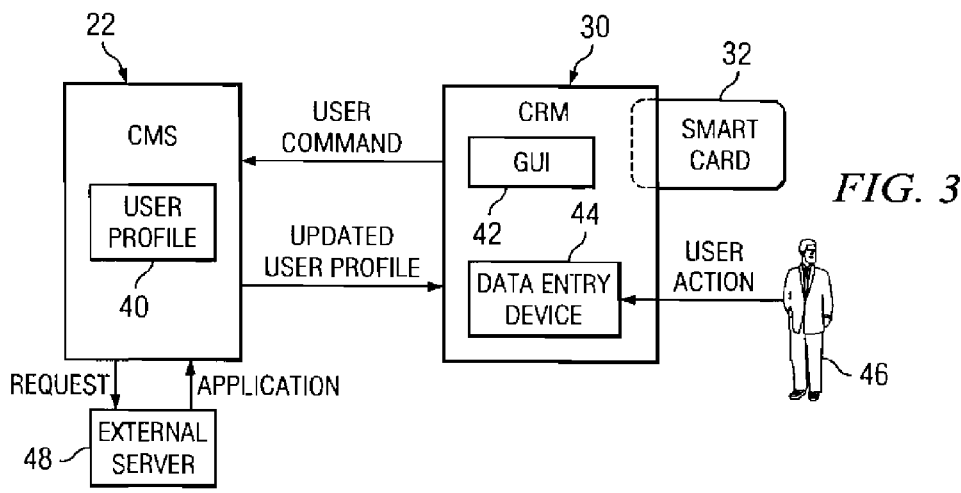
FIG. 3 is an illustration of the flow of information between the smartcard user, the CMS, an external server, and the CSS.

As part of the present invention, the smartcard user can modify his user profile from any CSS. FIG. 3 is an illustration of the process of a user 46 modifying his user profile 40. FIG. 2 is best understood when viewed in conjunction with User Action Program (UAP) 200 in FIG. 6. User 46 views his user profile on GUI 42. User 46 then performs a user action on a input device 44. CSS 30 transforms the user action into an electronic user command and transmits the user command to CMS 22. CMS 22 uses the user command to modify user profile 40. If necessary, CMS 22 can send a request to external server 48 and external server 48 will send an application, an update, or similar data back to CMS 22. CMS 22 then sends the updated user profile back to CSS 30, where CSS 30 displays the updated user profile on GUI 42. This process illustrated in FIG. 3 ends when smartcard 32 is removed into CSS 30 or user 46 terminates the process by input into input device 44. Alternatively, the user profile can be installed on the smartcard and updates sent to a user profile archive in the CMS.

The internal configuration of a computer, including connection and orientation of the processor, memory, and input/output devices, is well known in the art. The present invention is a methodology that can be embodied in a computer program. Referring to FIG. 4, the methodology of the present invention is implemented on software by Smartcard Management Program (SNP) 100. SMP 100 comprises User Action Program (UAP) 200, User Command Program (UCP) 300, Application Status Update Program (ASUP) 400, and Card Status Update Program (CSUP) 500. SMP 100, UAP 200, UCP 300, ASUP 400, and CSLTP 500 described herein can be stored within the memory of a computer on CMS 22, SS 24, DS 28, or the CSS 30 depicted in FIGS. 1, 2, and 3. Alternatively, SMP 100, UAP 200, UCP 300, ASUP 400, and/or CSUP 500 can be stored in an external storage device such as a removable disk or a CD-ROM. Memory 98 is illustrative of the memory within CMS 22 of FIGS. 1, 2, and 3. Memory 92 also contains user profile 40. The present invention may interface with user profile 40 through memory 98. As part of the present invention, the memory 98 can be configured with SMP 100, UAP 200, UCP 300, ASUP 400, and/or CSUP 500.

In alternative embodiments, SMP 100, UAP 200, UCP 300, ASUP 400, and/or CSUP 500 can be stored in the memory of other computers. This configuration allows the processor workload to be distributed across a plurality of processors instead of a single processor. Further configurations of SMP 100, UAP 200, UCP 300, ASUP 400, and/or CSUP 500 across various memories are known by persons skilled in the art.

Turning to FIG. 5, a flowchart of the logic of SMP 100 is illustrated. SMP 100 is a program which runs while the smartcard is inserted into a CSS. SMP 100 starts (102) when the user inserts the smartcard into the CSS (104). Generally, the user must enter his PIN on the input device on the CSS in conjunction with inserting the smartcard into the CSS. The CSS then reads the CIN from the smartcard and transmits the CIN to the CMS (106). The CMS then uses the CIN to access the user profile (108). The CMS then transmits the user profile back to the CSS (110). The CSS then displays the user profile on the GUI (112). SMP 100 then makes a determination whether there is a user command (114). If there is a user command, SMP 100 runs UAP 200 (116) and returns to step 114. If at step 114 there is not a user command (i.e. the user has removed his smartcard from the CSS), SMP 100 ends (118).

Turning to FIG. 6, a flowchart of the logic of UAP 200 is illustrated. UAP 200 starts (202) when prompted by SMP 100. UAP 200 accepts the user command entered in SMP 100 (204) and directs the CSS to transmit the user command to the CMS (206). UAP 200 then makes a determination whether an application is available from an external source (208). If an application is available from an external source, UAP 200 obtains the application from the external source (210) and proceeds to step 212. If at step 208 an application is not available from an external source, UAP 200 proceeds directly to step 212. At step 212, UAP 200 runs UCP 300 (212). UAP 200 then runs ASUP 400 (214) and CSUP 500 (216). UAP 200 then directs the CMS to send the updated user profile to the CSS (218). The CSS then displays the updated user profile on the GUI (220). UAP 200 then ends (222).

Turning to FIG. 7, a flowchart of the logic of UCP 300 is illustrated. UCP 300 starts (302) when prompted by UAP 200. UCP 300 accepts the user command entered in SMP 100 (304). UCP 300 then makes a determination whether the user command is a card action or an application action (306). In other words, UCP 300 classifies user commands into commands concerning applications installed on the card and commands concerning the smartcard itself. If the command is a card action, then UCP 300 makes a determination whether the card action is a user command to update the PIN (308). If the user does not want to update the PIN, UCP 300 returns to step 306. If the user wants to update the PIN, the UCP 300 allows the user to update the PIN (310) and proceeds to step 332. Persons skilled in the art are aware of other card actions in addition to updating a PIN.

Returning to step 306, if the user command is an application action, then UCP 300 proceeds to step 312 where UCP 300 makes a determination whether the user command is to add an application (312). If the user command is to add an application, then UCP 300 adds the application to the user profile (314) and proceeds to step 332. In adding the application to the user profile, UCP 300 downloads the compressed application data file to the user profile and/or smartcard and adds the application name to the application name column (see FIG. 10). Returning to step 312, if the user does not want to add an application, UCP 300 proceeds to step 316 where UCP 300 makes a determination whether the user command is to install an application (316). If the user command is to install an application, UCP 300 installs the application (318) and proceeds to step 332. In installing the application, UCP 300 decompresses the compressed application data file and runs the install program associated with the application. Returning to step 316, if the user does not want to install an application, USP 300 proceeds to step 320 where UCP 300 makes a determination whether the user command is to personalize an application (320). If the user wants to personalize an application, then UCP 300 personalizes the application selected by the user (322) and proceeds to step 332. In personalizing the application, the user adds any necessary or optional data to the application to place the application in a state to perform a task. Personalizing an application can include registering the application.

Returning to step 320, if the user does not want to personalize the application, then UCP 300 makes a determination whether the user command is to update an application (324). If the user wants to update an application, then UCP 300 downloads the update from the applicable location, installs the update (326), and proceeds to step 332. Returning to step 324, if the user does not want to update the application, UCP 300 makes a determination whether the user wants to delete the application (328). If the user does not want to delete the application, UCP 300 returns to step 312. If the user wants to delete the application, UCP 300 deletes the application from the user profile (330) and proceeds to step 332. In deleting the application, UCP 300 removes the application from the user profile and/or the smartcard. Persons skilled in the art are aware of how to add, install, personalize, update, and delete an application from a smartcard and/or user profile. Persons skilled in the art are also aware of other application actions besides the ones described in steps 312 through 330. UCP 300 then updates the user profile (332) and ends (334).

Figure 8A:
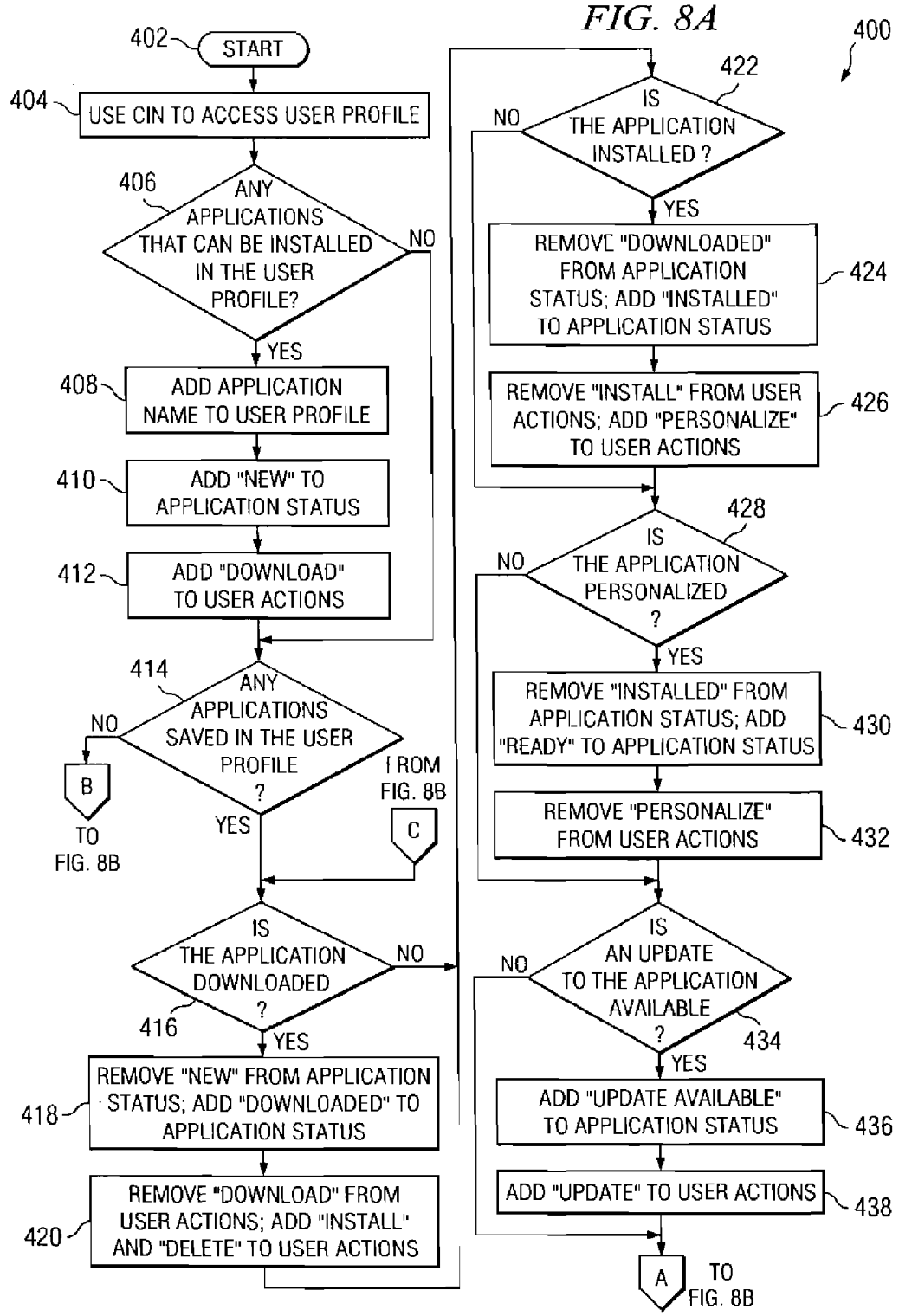
FIG. 8 is a flowchart of the Application Status Update Program (ASUP) of the present invention.
Figure 8B:
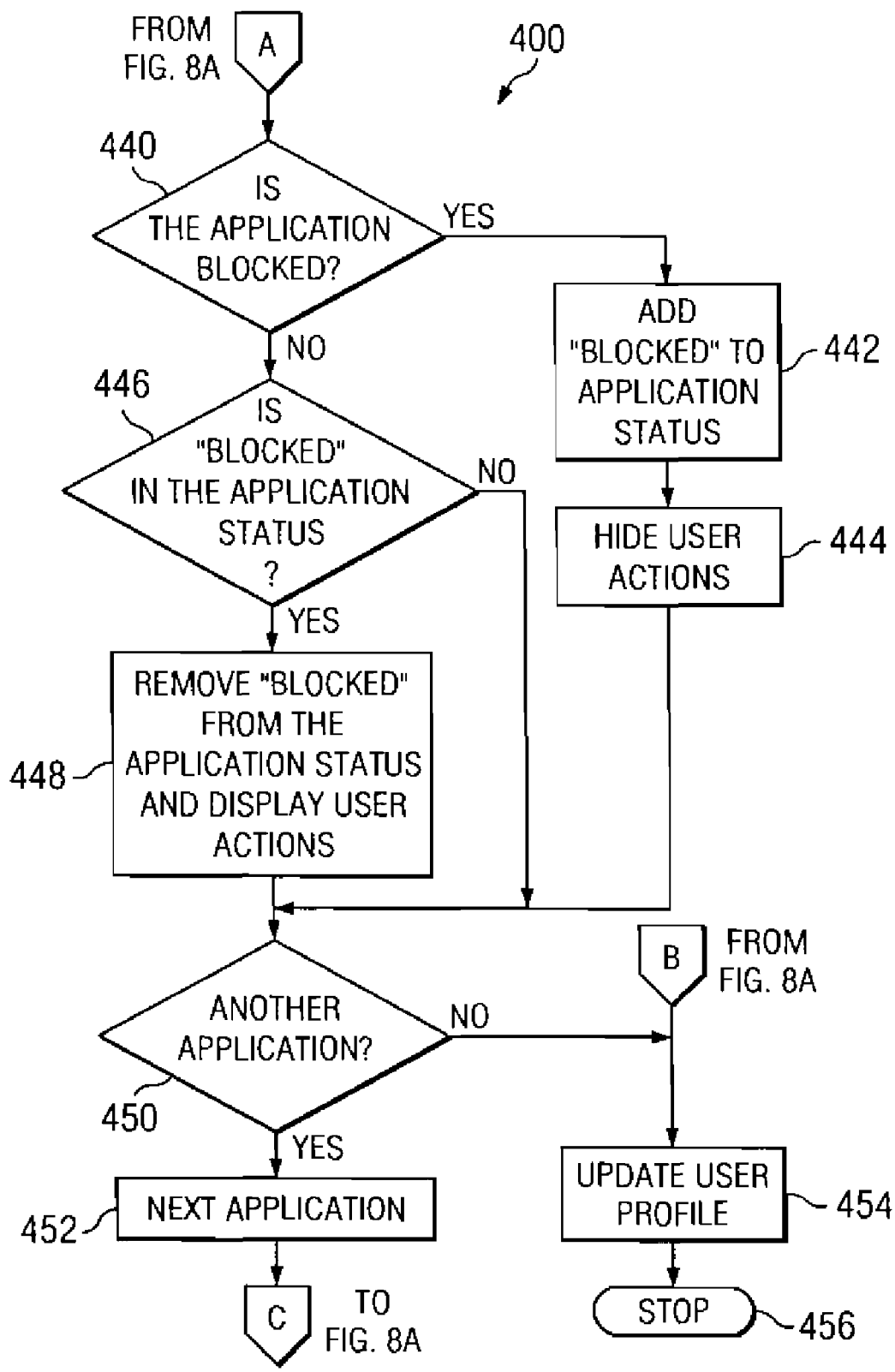

Turning to FIG. 8, a flowchart of the logic of ASUP 400 is illustrated. ASUP 400 starts (402) when prompted by UAP 200. ASUP 400 uses the CIN to access the user profile (404). ASUP 400 then makes a determination whether there are any applications that can be installed on the user profile which are not already installed (406). If there are not any applications that can be installed on the user profile, ASUP 400 proceeds directly to step 414. If there are applications which can be installed, ASUP 400 adds the application name column of the user profile (see FIG. 10) (408). ASUP 400 then adds the "new" icon to the application status column (see FIG. 10) (410). ASUP 400 then adds the "download" button to the user actions column (see FIG. 10) (412). ASUP 400 then proceeds to step 414.

At step 414, ASUP 400 makes a determination whether any applications are saved on the user profile (414). If there are not any applications saved on the user profile, ASUP 400 proceeds to step 454. If there are applications saved on the user profile, ASUP 400 goes to the first application and makes a determination whether the application is downloaded (416). If the application is downloaded, ASUP 400 removes the "new" icon from the application status column and adds the "downloaded" icon to the application status column (418). ASUP 400 then removes the "download" button from the user action column and adds the "install" and "delete" buttons to the user action column (420). ASUP 400 then proceeds to step 422.

Returning to step 416, if the application is not downloaded, then ASUP 400 proceeds to step 422 where ASUP 400 makes a determination whether the application is installed (422). If the application is installed, ASUP 400 removes the "downloaded" icon from the application status column and adds the "installed" icon to the application status column (424). ASUP 400 then removes the "install" button from the user action column and adds the "personalize" button to the user action column (426). ASUP 400 then proceeds to step 428.

Returning to step 422, if the application is not installed, then ASUP 400 proceeds to step 428 where ASUP 400 makes a determination whether the application is personalized (428). If the application is personalized, ASUP 400 removes the "installed" icon from the application status column and adds the "ready" icon to the application status column (430). ASUP 400 then removes the "personalize" button from the user action column (432). ASUP 400 then proceeds to step 434.

Returning to step 428, if the application is not personalized, then ASUP 400 proceeds to step 434 where ASUP 400 makes a determination whether an update for the application is available (434). If an update for the application is available, ASUP 400 adds the "update available" icon to the application status column (436). ASUP 400 then adds the "update" button to the user action column (438). ASUP 400 then proceeds to step 440.

Returning to step 434, if an update for the application is not available, ASUP 400 proceeds to step 440 where ASUP 400 makes a determination whether the application is blocked (440). An application is blocked if the application issuer has stopped the user from using the particular application. Persons skilled in the art are aware of how to block an application on a smartcard. If the application is blocked, ASUP 400 adds the "blocked" icon to the application status column (442). ASUP 400 then hides the buttons in the user action column (444). ASUP 400 then proceeds to step 450.

Returning to step 440, if the application is not blocked, ASUP 400 proceeds to step 446 where ASUP 400 makes a determination whether the "blocked" icon is in the application status column (446). If the "blocked" icon is not in the application status column, ASUP 400 proceeds to step 450. If the "blocked" icon is in the application status column, ASUP 400 removes the "blocked" icon from the application status column and displays the user action buttons (448). ASUP 400 then proceeds to step 450.

At step 450, ASUP 400 makes a determination whether there is another application on the user profile (450). If there is another application on the user profile, ASUP 400 goes to the next application (452) and returns to step 416. If at step 450 there is not another application, ASUP 400 updates the user profile (454) and ends (456).

Turning to FIG. 9, a flowchart of the logic of CSUP 500 is illustrated. CSUP 500 starts (502) when prompted by UAP 200. CSUP 500 then uses the CIN to access the user profile (504). CSUP 500 then makes a determination whether the smartcard has been terminated (506). A smartcard has been terminated if the smartcard issuer has blocked all activity on the smartcard. A smartcard may be terminated if the smartcard is lost or stolen. Persons skilled in the art are aware of how to terminate a smartcard. If the smartcard has been terminated, CSUP 500 changes the card status to "card terminated" (508) and proceeds to step 520. If at step 506 the card has not been terminated, CSUP 500 makes a determination whether the PIN has been reset (510). A PIN has been reset when the smartcard issuer deletes an old PIN and requests that the user set a new PIN. Persons skilled in the art are aware of how to reset a PIN. If the PIN has been reset, CSUP 500 changes the card status to "update PIN" (512) and proceeds to step 520. If at step 510 the PIN has not been reset, CSUP 500 makes a determination whether the card is locked (514). A card is locked if the smartcard issuer wants to temporarily block the use of the card, but not terminate the card. Persons skilled in the art are aware of how to lock a smartcard. If the card is locked, CSUP 500 changes the card status to "card locked—call customer service for more information" (516) and proceeds to step 520. If at step 514 the card is not locked, CSUP 500 changes the card status to "ready" (518) and proceeds to step 520. At step 520, CSUP 500 updates the user profile (520) and ends (522).

FIG. 10 is one possible display 600 from GUI 42 depicted in FIGS. 2 and 3. Display 600 depicts the card status 602, which is modified by CSUP 500 in FIG. 9. Display 600 also depicts numerous applications 604 which can be modified by UCP 300 depicted in FIG. 7 and ASUP 400 depicted in FIG. 8. ASUP 400 makes reference to application name column 606, application status column 608, user action column 610, all of which are depicted in display 600. Display 600 also contains information column 612 which displays any additional information related to a particular application 604.

While the disclosed application for the present invention is within smartcards, this disclosure is not meant to be limiting in any way. The present invention can be alternatively embodied in wireless devices, home appliances, and the like. In fact, the present invention is advantageous whenever there is a need to organize various kinds of information.

With respect to the above description, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. The novel spirit of the present invention is still embodied by reordering or deleting some of the steps contained in this disclosure. The spirit of the invention is not meant to be limited in any way except by proper construction of the following claims.

What is claimed is:

1. A method for managing a plurality of applications on a smartcard comprising:
    receiving a personal identification number from an input device of a client card system, wherein the smartcard is inserted into the client card system, and wherein the client card system comprises a computer having an interface for communication with the smart card;
    obtaining a chip information number from the smartcard;
    using the chip information number to obtain a user profile;
    transmitting the user profile to a graphical user interface;
    displaying data contained within the user profile on the graphical user interface, wherein the data contained within the user profile corresponds to the plurality of applications, wherein the graphical user interface depicts the plurality of applications that are operable to be modified, and wherein the graphical user interface depicts, for each of the plurality of applications, an application name, an application status, available user actions, and additional information related to each of the plurality of applications;
    receiving at least one user command for at least one of the plurality of applications, wherein a set of available user actions is determined for each of the plurality of applications, wherein a user command performs an available user action from a set of available user actions corresponding to one of the plurality of applications; and
    responsive to receiving the at least one user command, updating the user profile by executing the at least one user command to perform at least one corresponding available user action for the at least one of the plurality of applications, wherein updates to the user profile are installed on the smartcard.

2. The method of claim 1,
    wherein the at least one user command comprises a user command to reset a PIN for the at least one of the plurality of applications, further comprising:
    resetting the PIN for the at least one of the plurality of applications.

3. The method of claim 1, wherein the client card system is an automated teller machine.

4. The method of claim 1, wherein the client card system is a point-of-sale terminal.

5. The method of claim 1, wherein the at least one user command comprises a user command for downloading the at least one of the plurality of applications, further comprising:
    downloading the at least one of the plurality of applications.

6. The method of claim 1, wherein the at least one user command comprises a user command for updating the at least one of the plurality of applications, further comprising:
    updating the at least one of the plurality of applications.

7. The method of claim 1, wherein the at least one user command comprises a user command for installing the at least one of the plurality of applications, further comprising:
    installing the at least one of the plurality of applications.

8. The method of claim 1, wherein the at least one user command comprises a user command for deleting the at least one of the plurality of applications, further comprising:
    deleting the at least one of the plurality of applications.

9. The method of claim 1, wherein the at least one user command comprises a user command for personalizing the at least one of the plurality of applications, further comprising:
    personalizing the at least one of the plurality of applications.

10. The method of claim 1, wherein a first set of available user action is determined for a first application of the plurality of applications and a second set of available user action is determined for a second application of the plurality of applications; and wherein the first set of available user actions is different than the second set of available user actions.

11. The method of claim 1, wherein the available user actions are at least one of add, delete, update, install, personalize, and download.

12. The method of claim 1, wherein the application status is at least one of new, downloaded, ready, installed, blocked, deleted, update available, and pin updated.

13. A computer program product operable on a computer for managing a plurality of applications on a smartcard, the computer program product comprising:
    a computer readable storage medium;
    a plurality of instructions stored in the computer readable storage medium, wherein the plurality of instructions are configured to cause a processor in the computer to execute the plurality of instructions comprising:
    instructions for receiving a personal identification number from an input device of a client card system, wherein the smartcard is inserted into the client card system, and wherein the client card system comprises a computer having an interface for communication with the smart card;

instructions for obtaining a chip information number from the smartcard;

instructions for using the chip information number to obtain a user profile;

instructions for transmitting the user profile to a graphical user interface;

instructions for displaying data contained within the user profile on the graphical user interface, wherein the data contained within the user profile corresponds to the plurality of applications, wherein the graphical user interface depicts the plurality of applications that are operable to be modified by the user, and wherein the graphical user interface depicts, for each of the plurality of applications, an application name, an application status, available user actions, and additional information related to each of the plurality of applications;

instructions for receiving at least one user command for at least one of the plurality of applications, wherein a set of available user actions is determined for each of the plurality of applications, wherein a user command performs an available user action from a set of available user actions corresponding to one of the plurality of applications; and instructions for, responsive to receiving the at least one user command, updating the user profile by executing the at least one user command to perform at least one corresponding available user action for the at least one of the plurality of applications, wherein updates to the user profile are installed on the smartcard.

14. The computer program product of claim 13, wherein the at least one user command comprises a user command to reset a PIN for the at least one of the plurality of applications, further comprising:

instructions for resetting the PIN for the at least one of the plurality of applications.

15. The computer program product of claim 13, wherein the at least one user command comprises a user command for downloading the at least one of the plurality of applications, further comprising:

instructions for downloading the at least one of the plurality of applications.

16. The computer program product of claim 13, wherein the at least one user command comprises a user command for updating the at least one of the plurality of applications, further comprising:

instructions for updating the at least one of the plurality of applications.

17. The computer program product of claim 13, wherein the at least one user command comprises a user command for installing the at least one of the plurality of applications, further comprising:

instructions for installing the at least one of the plurality of applications.

18. The computer program product of claim 13, wherein the at least one user command comprises a user command for deleting the at least one of the plurality of applications, further comprising:

instructions for deleting the at least one of the plurality of applications.

19. The computer program product of claim 13, wherein the at least one user command comprises a user command for personalizing the at least one of the plurality of applications, further comprising:

instructions for personalizing the at least one of the plurality of applications.

20. An apparatus for managing a plurality of applications on a smartcard, the apparatus comprising:

a processor connected to a storage device;

a smartcard management program installed on the storage device; and wherein the processor executes the smartcard management program to:

receive a personal identification number from an input device of a client card system, wherein the smartcard is inserted into the client card system, and wherein the client card system comprises a computer having an interface for communication with the smart card;

obtain a chip information number from the smartcard;

using the chip information number to obtain a user profile;

transmitting the user profile to a graphical user interface;

displaying data contained within the user profile on the graphical user interface, wherein the data contained within the user profile corresponds to the plurality of applications, wherein the graphical user interface depicts the plurality of applications that are operable to be modified by the user, and wherein the graphical user interface depicts, for each of the plurality of applications, an application name, an application status, available user actions, and additional information related to each of the plurality of applications;

receiving at least one user command for at least one of the plurality of applications, wherein a set of available user actions is determined for each of the plurality of applications, wherein a user command performs an available user action from a set of available user actions corresponding to one of the plurality of applications; and responsive to receiving the at least one user command, updating the user profile by executing the at least one user command to perform at least one corresponding available user action for the at least one of the plurality of applications, wherein updates to the user profile are installed on the smartcard.

21. The apparatus of claim 20, wherein the client card system is an automated teller machine.

22. The apparatus of claim 20, wherein the client card system is a point-of-sale terminal.

23. The apparatus of claim 20, wherein the client card system, a chip management system, a security server, and a distribution server are connected to a communication network.

24. The apparatus of claim 23, wherein the smartcard management program, the client card system, the chip management system, the security server, and the distribution server communicate with one another via the communication network to update the smartcard using a secure communication channel established within the communication network.

* * * * *